July 2, 1946.  E. A. HERTZELL ET AL  2,403,364

GASKET

Filed July 31, 1943

Inventors
EMANUEL A. HERTZELL
AND
RICHARD H. ANDERSON

By Ely & Frye

Attorneys

Patented July 2, 1946

2,403,364

UNITED STATES PATENT OFFICE 2,403,364

GASKET

Emanuel A. Hertzell and Richard H. Anderson, Dover, Ohio, assignors to The Robinson Clay Product Company, Akron, Ohio, a corporation of Maine Application July 31, 1943, Serial No. 497,142

5 Claims. (Cl. 288—24)

1

This invention relates to gaskets and more especially it relates to pipe-joint gaskets such as may be employed between the confronting ends of conjoined pipe sections to provide an effective seal thereat. The invention is of primary utility when used in pipe lines that carry fluid under pressure, experience having demonstrated its ability to function effectively under pressures up to 1000 pounds per square inch.

The chief objects of the invention are to provide a gasket of the character mentioned that is relatively simple in construction and relatively inexpensive to manufacture; that is so constructed as to compensate for out-of-round condition of one or both confronting pipe sections and thereby to provide an effective fluid-seal even under such adverse conditions; to provide a gasket of the character mentioned that utilizes its own inherent physical characteristics for maintaining fluid-sealing engagement with the pipe sections; and to provide a pipe gasket of such construction and arrangement that the pressure of the fluid in the pipe assists in maintaining the seal between pipe and gasket. Other objects will be manifest as the description proceeds.

Figure 1:
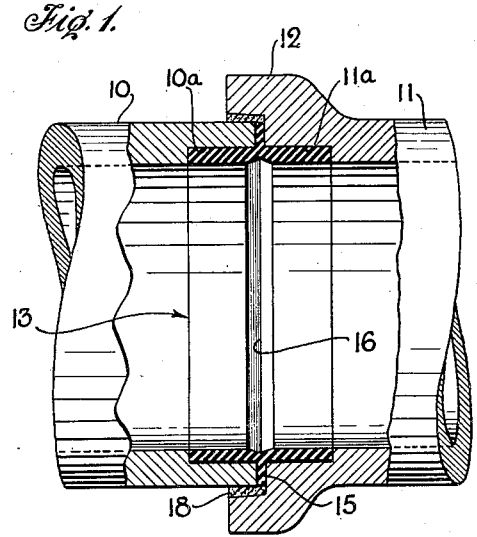
Fig. 1 is a diametric section through the joint of two conjoined pipe sections of the socket type, and the improved gasket in operative position in said joint.

Referring to Fig. 1 of the drawing, there is shown a pair of conjoined pipe sections 10, 11 of the socket type, section 11 being shown with a flange or collar 12 that defines the socket in which the confronting end of pipe section 10 is received. Said pipe sections may be composed of clay, iron, or any other suitable material so as to constitute a pipe capable of withstanding up to about 1000 pounds internal pressure. Sealing the joint between pipe sections 10, 11 is the im-

2 proved gasket that is designated as a whole by the numeral 13.

Figure 5:
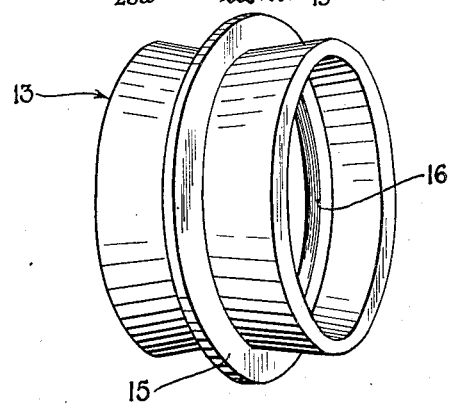
Fig. 5 is a perspective view of the improved gasket of Figs. 1 and 3 in its normal unstressed condition.

The gasket 13, which is best shown in Fig. 5, is composed of resilient impervious material, preferably vulcanized rubber or the like. Said gasket is a tube or annulus that is formed on its periphery with an integral circumferential flange 15, which flange may be about half as thick as the remainder of the structure. The flange 15 is located midway between the ends of the gasket, and in use is confined between the confronting end faces of the pipe sections 10, 11. Preferably, but not necessarily, the inner circumference of the gasket is formed with a shallow circumferential groove 16 that is located midway between opposite ends of the gasket structure, said groove preferably being V-shaped as shown. Exclusive of the flange 15, the general shape of the gasket 13 is that of two confronting hollow truncated cones which have their smaller ends contiguous with said flange. In other words, the gasket is flared uniformly from its central flange toward its respective ends.

The gasket 13 is designed to be received within the confronting end portions of the pipe sections 10, 11, and in the embodiment of the invention shown in Fig. 1 the inner surfaces of the respective pipe sections are formed with circumferential grooves or recesses 10a, 11a that extend rearwardly from the end faces of the section and constitute seats for opposite end portions of the gasket. The recesses 10a, 11a are of uniform radial depth, which depth is substantially the same as the wall-thickness of the portions of the gasket received therein so that in the finished joint the inner circumference of the gasket is substantially flush with the inner surfaces of the pipe sections, and there is no local reduction in the effective area of the pipe. The diameter of pipe sections 10, 11 within the grooves 10a, 11a is the same as the smallest outside diameter of the gasket 13, and is considerably smaller than the outside diameter of the gasket at opposite ends thereof due to the oppositely flared construction of the gasket body. The extent of such flare may vary in different size gaskets, but generally the outside diameter of the gasket at the ends thereof exceeds the outside diameter thereof at the flange 15 by an amount equal to twice the thickness of the gasket wall.

The arrangement is such that when the gasket is mounted in operative position within the grooves in the ends of the pipe sections, the opposite end portions of the gasket are constricted and thereby placed under compressive stress, with the result that there is an expansive force inherent in the gasket to urge it into sealing relation with the pipe sections. Furthermore, said force is greatest at the ends of the gasket so as normally to preclude the possibility of fluid entering between the gasket and its seat in the pipe sections. The normal expansive force in the gasket is supplemented by the pressure of fluid in the pipe, which fluid by forcing the gasket more firmly into its seat, further reduces the possibility of leakage at the joint.

In mounting the gasket in a pipe, one end portion of the gasket is manually constricted or deformed and inserted into one pipe section, the flange 15 constituting an abutment to assure that the gasket will be inserted to the proper extent. Thereafter the other end portion is similarly manually deformed and the other pipe section telescoped therewith. When properly positioned the flange 15 will be confined between the end faces of the pipe sections. Being flexible, the gasket readily will conform to any irregularities in the surface of the pipe sections, and also will conform to out-of-round condition of either or both pipe sections, the central groove 16 of the gasket enabling the respective end portions of the gasket to flex independently of each other. The joint shown in Fig. 1 is completed by the application of jointing compound 18 to the socket in the end of pipe section 11, surrounding the end portion of pipe section 10 therein. Said jointing compound may consist of asphalt composition, sulfur-silica cement, Portland cement, acid proof cement, or any other suitable cement. Since the sealing of the joint is effected by the gasket 13, the purpose of said cement is merely to hold the pipe sections in proper fixed position with relation to each other.

The improved gasket is relatively simple in construction, is easily applied, and achieves the other advantages set out in the foregoing statement of objects.

Figure 2:
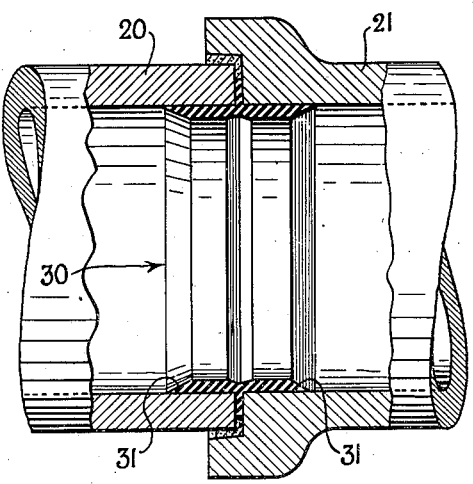
Fig. 2 is a section similar to Fig. 1 showing another embodiment of the invention operatively associated with socket pipe of slightly different internal construction.

The pipe joint shown in Fig. 2 is substantially similar to the joint hereinbefore described, except that the pipe sections 20, 21 are not provided interiorly with gasket-seating grooves, such as the grooves 10a, 11a of Fig. 1, and the gasket, herein designated as a whole by the numeral 30, is slightly modified. Thus the end portions of the gasket 30 are required to telescope with and operatively engage the normal inner circumference of the pipe sections. Accordingly, if the pipe sections of Fig. 2 are of the same diameter as the pipe sections of Fig. 1, the gasket 30 employed in Fig. 2 will be of smaller diameter than the gasket employed in Fig. 1 and will reduce the effective area of the pipe line to the extent of the thickness of its wall. Opposite ends of the gasket 30 are interiorly beveled at 31 so as to reduce the flow-impeding effect of the gasket. In all other respects the arrangement shown in Fig. 2 is identical with that shown in Fig. 1 and achieves the other advantages of the latter.

Figure 3:
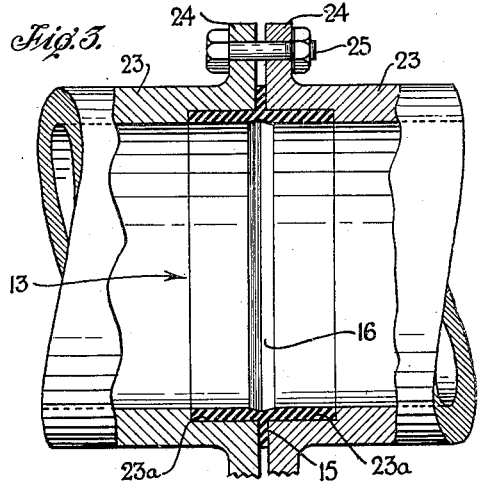
Fig. 3 is a section showing the improved gasket of Fig. 1 mounted between the ends of pipe sections that are butt-joined.

The application of the invention shown in Fig. 3 is identical with that shown in Fig. 1 except that different construction is employed for holding the pipe sections together. As shown, the pipe comprises identical sections 23, 23, the confronting ends of which are formed exteriorly with radial flanges 24, the flanges of one section being secured to the flanges of adjacent sections by bolts, such as the bolt 25. Confronting end portions of the pipe sections 23 are formed interiorly with respective grooves 23a in which the gasket 13 is received. No jointing compound is required for pipe joints of this type. By the tightening of the bolts 25 the flange 15 of the gasket 13 is placed under compressive stress, whereby the effective sealing area of the gasket is increased as compared to the arrangement shown in Figs. 1 and 2.

Figure 4:
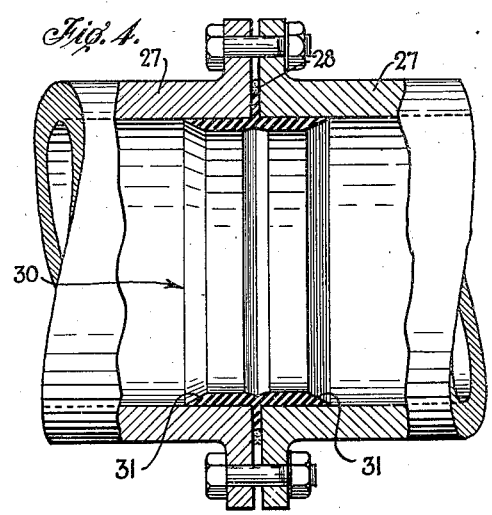
Fig. 4 is a section similar to Fig. 3 showing the modified gasket of Fig. 2 operatively associated with butt-joined pipe of slightly different internal construction.

The application of the invention shown in Fig. 4 employs pipe sections 27, 27 that are similar to pipe sections 23, except that grooves 23a of the latter are omitted. A gasket 30 is mounted within the pipe section ends in the same manner as in Fig. 2. A small amount of jointing compound 28 may be used between pipe sections 27, about the perimeter of flange 15 of the gasket if desired.

Other modification may be resorted to without departing from the spirit of the invention or the scope thereof as defined by the appended claims.

What is claimed is:

1. A gasket for pipe joints composed of impervious resilient material adapted to telescope within the confronting end portions of conjoined pipe sections, said gasket consisting of a one-piece structure comprising two coaxial hollow truncated cones that meet and are united with each other at their smaller ends.

2. A gasket as defined in claim 1 including a circumferential flange formed on the periphery of the gasket at the juncture of the truncated cones.

3. A gasket as defined in claim 1 wherein the gasket structure is formed interiorly with a circumferential groove located at the juncture of the truncated cones to enable deformation thereof in their entirety independently of each other.

4. A gasket for pipe joints consisting of a tubular structure composed solely and entirely of impervious resilient material adapted to telescope within the confronting end portions of conjoined pipe sections, said structure being formed exteriorly with an integral peripheral flange midway between the ends thereof, and formed interiorly with a centrally disposed circumferential groove that enables the respective end portions of the structure to be deformed independently of each other, the said end portions of the structure being flared outwardly from the medial region of the structure toward the respective ends thereof.

5. A combination as defined in claim 4 wherein the respective end portions of the gasket are interiorly beveled to reduce the flow-impeding effect of the gasket.

EMANUEL A. HERTZELL.
RICHARD H. ANDERSON.